US009340189B2

(12) United States Patent
Menne et al.

(10) Patent No.: US 9,340,189 B2
(45) Date of Patent: May 17, 2016

(54) DISCONNECTABLE HYDRODYNAMIC RETARDER AND METHOD FOR CONTROLLING SAME

(71) Applicant: Voith Patent GmbH, Heidenheim (DE)

(72) Inventors: Achim Menne, Crailsheim (DE); Tilman Huth, Satteldorf (DE); Dieter Laukemann, Crailsheim (DE); Werner Koch, Deggingen (DE); Werner Klement, Heidenheim (DE); Martin Becke, Ulm (DE)

(73) Assignee: Voith Patent GmbH, Heidenheim (DE)

( * ) Notice: Subject to any disclaimer, the term of this patent is extended or adjusted under 35 U.S.C. 154(b) by 136 days.

(21) Appl. No.: 14/004,637

(22) PCT Filed: Nov. 27, 2012

(86) PCT No.: PCT/EP2012/073663
§ 371 (c)(1),
(2) Date: Sep. 11, 2013

(87) PCT Pub. No.: WO2013/083427
PCT Pub. Date: Jun. 13, 2013

(65) Prior Publication Data
US 2014/0182983 A1 Jul. 3, 2014

(30) Foreign Application Priority Data
Dec. 9, 2011 (DE) .......................... 10 2011 120 622

(51) Int. Cl.
*B60T 10/02* (2006.01)
*F16D 57/04* (2006.01)

(52) U.S. Cl.
CPC ................. *B60T 10/02* (2013.01); *F16D 57/04* (2013.01)

(58) Field of Classification Search
CPC ......... F16H 41/24; B60T 1/087; B60T 10/02; B60T 1/12
USPC .................................................. 188/290, 291
See application file for complete search history.

(56) References Cited

U.S. PATENT DOCUMENTS

2002/0079173 A1* 6/2002 Suo et al. ...................... 188/158
2003/0186772 A1* 10/2003 Grogg et al. .................. 475/198
(Continued)

FOREIGN PATENT DOCUMENTS

CN        1914077 A        2/2007
DE        199 27 397        12/2000
(Continued)

OTHER PUBLICATIONS

English Translation of PCT International Preliminary Report on Patentability dated Jun. 10, 2014 in PCT Application No. PCT/EP2012/073663.

*Primary Examiner* — Christopher Schwartz
(74) *Attorney, Agent, or Firm* — Farjami & Farjami LLP

(57) ABSTRACT

The invention concerns a hydrodynamic retarder
having a rotor which can be brought into rotation via a drive unit and a fixed stator or a stator rotating in opposite direction to the rotor, whereas the rotor and the stator comprise bladed wheels, which form together a working chamber which can be filled with working medium;
the drive unit is provided with a separating clutch, by means of which the rotor can be disconnected for its immobilisation, comprising a driven primary side and a secondary side associated with the rotor;
having a control device which controls the opening and closing of the separating clutch for switching the retarder (17).
The invention is characterised in that the control device when closing the separating clutch detects the run-up behaviour of the secondary side of the separating clutch and/or of the rotor via at least one associated sensor or defines the run-up behaviour from at least one input value supplied thereto and according to the run-up behaviour initiates either the continuous closing of the separating clutch for slip bridging between the primary side and the secondary side for accelerating the rotor or the interruption of the closing process of the separating clutch.

20 Claims, 1 Drawing Sheet

(56) References Cited

U.S. PATENT DOCUMENTS

| | | | |
|---|---|---|---|
| 2004/0111203 A1* | 6/2004 | Higashimata et al. | 701/51 |
| 2006/0166775 A1* | 7/2006 | Gradu | 475/101 |
| 2014/0081528 A1* | 3/2014 | Menne et al. | 701/48 |
| 2014/0113759 A1* | 4/2014 | Menne et al. | 475/91 |
| 2014/0151176 A1* | 6/2014 | Menne et al. | 192/3.24 |
| 2014/0182983 A1* | 7/2014 | Menne et al. | 188/291 |
| 2014/0311840 A1* | 10/2014 | Menne et al. | 188/290 |
| 2014/0330495 A1* | 11/2014 | Menne et al. | 701/68 |
| 2015/0184733 A1* | 7/2015 | Menne et al. | 701/68 |

FOREIGN PATENT DOCUMENTS

| | | |
|---|---|---|
| DE | 10 2005 052 121 | 5/2007 |
| DE | 10 2009 001 146 | 8/2010 |
| EP | 2 024 209 | 5/2008 |
| GB | 1272020 | 4/1972 |

* cited by examiner

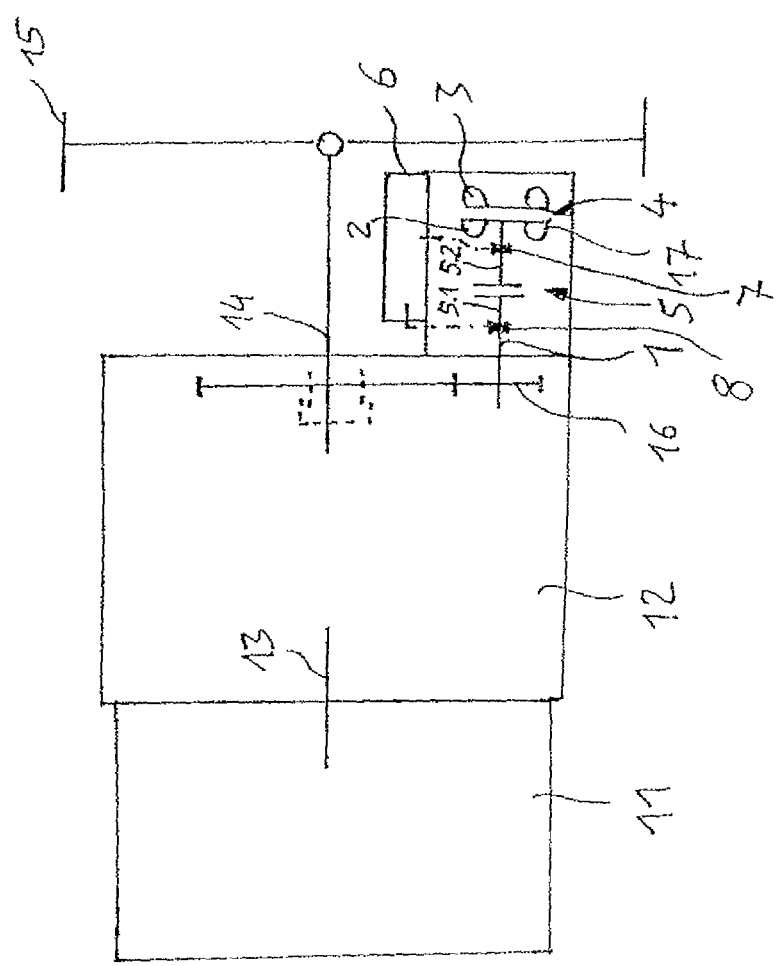

DISCONNECTABLE HYDRODYNAMIC RETARDER AND METHOD FOR CONTROLLING SAME

This is a U.S. national phase application, which is based on, and claims priority from, PCT application Ser. No. PCT/EP2012/073663, filed Nov. 27, 2012, which claims priority from foreign application Serial No. 10 2011 120 622.5, filed Dec. 9, 2011, in Germany.

FIELD OF THE INVENTION

The present invention concerns a hydrodynamic retarder which by means of a separating clutch can be disconnected from its drive unit as well as a method for controlling the switching on and off of such a hydrodynamic retarder.

BACKGROUND

Hydrodynamic retarders have been used for many years as wear-free continuous brakes in motor vehicles on tracks as well as on the road, the latter in particular in lorries. Although such wear-free continuous brakes indisputably entail considerable benefits in terms of safety when braking the vehicle and in terms of reduced wear of the frictional service brakes, the no-load losses in non-braking mode of the hydrodynamic retarder constitute a critical point. Consequently, said no-load losses could still be decreased by providing so-called ventilation plates or by providing a rotor (primary wheel) moving out from the stator (secondary wheel) in non-braking mode, especially the latter measure is however insufficient normally to bring the no-load losses practically down to zero.

A possibility to bring down to zero the no-load losses of such a hydrodynamic retarder consists in designing the hydrodynamic retarder by means of a separating clutch to be disconnectable from the drive train. The following shortcomings can be thus provided; on the one hand, the time for closing the separating clutch is added to the time for filling the hydrodynamic retarder, which thanks to the hydrodynamic retarder lengthens the reaction time between the activation request for the hydrodynamic retarder and the supplying of the required braking torque. On the other hand, the separating clutch, which in particular is designed as a friction coupling, may due to the high constraints, in particular when switching on the hydrodynamic retarder, cause maintenance to be required early or components to be replaced compared to drive trains with hydrodynamic retarders, which are connected to the drive train without a separating clutch.

The European patent document EP 2 024 209 B1 suggest for shortening the reaction time of a hydrodynamic retarder connected to the drive train via a separating clutch, to preventively close the separating clutch every time there is no traction of the motor vehicle and to couple the retarder in emptied condition.

The disclosure DE 199 27 397 A1 suggests a self-reinforcing friction coupling for engaging the hydrodynamic retarder, which enables to engage the hydrodynamic retarder also in filled condition.

The disclosure DE 10 2005 052 121 A1 suggests switching off a hydrodynamic retarder by emptying its working chamber and simultaneously releasing the stator, so that the latter may spin with the rotor.

The disclosure DE 10 2009 001 146 A1 suggests a coaxial arrangement of the rotor of the retarder and of the rotor of an electric motor which can be disconnected together from the drive train via a separating clutch, in particular a desynchronised separating clutch.

SUMMARY

The object of the present invention is then to provide a motor vehicle drive train with a hydrodynamic retarder which can be disengaged mechanically from the drive train by means of a separating clutch as well as a control method with which the shortcomings illustrated above can be reduced or avoided. The solution according to the invention should be characterised by a straightforward structural and cost-effective provision.

The object of the invention is satisfied with a hydrodynamic retarder having the features of claim 1 and a method for controlling the switching on and off of a hydrodynamic retarder having the features of claim 6. Advantageous and particularly appropriate embodiments of the invention are disclosed in the dependent claims.

A hydrodynamic retarder according to the invention, which according to the invention can be integral part of a motor vehicle drive train, in particular a rail vehicle or a road vehicle, in the latter case notably a lorry, includes as usual rotor and a stator. The rotor can be brought into rotation via a drive unit. The stator is fixed or, in the case of a so-called counterrotating retarder, can be brought into rotation in the opposite rotational direction of the rotor is in this instance still designated as a stator. The rotor as well as the stator include bladed wheels, which form together a working chamber which can be filled with working medium, to create a hydrodynamic circular flow in the working chamber by driving the rotor (and possibly driving the stator in the opposite direction), in order to transmit the torque from the rotor to the stator and hence to brake the rotor.

To bring the rotor into rotation, said rotor is connected to a drive unit. A separating clutch is provided in the drive unit so that the rotor in non-braking mode respectively when switching the retarder off can be disconnected from the drive unit and hence can be stopped. The rotor is again brought into rotation by closing the separating clutch. The separating clutch comprises accordingly a driven primary side which is hence associated with the drive unit, and a secondary side associated with the rotor. The separating clutch is designed as a slip coupling, that is to say during its closing, the slippage between the primary side and the secondary side is bridged little by little, so that the difference in rotational speed between the primary side and the secondary side decreases.

According to the invention, a control device is provided which controls the opening and closing of the separating clutch for switching the retarder on and off.

According to a first embodiment of the invention, to avoid any undesirable strain or overload of the separating clutch in frictional condition respectively during slip bridging, for instance because the working chamber of the hydrodynamic retarder is undesirably filled with working medium, or because the filling level of the working chamber exceeds a desired magnitude, the run-up behaviour of the secondary side of the separating clutch and/or of the rotor is detected via the control device when closing the separating clutch, since the filling condition can be deduced immediately. The detection can take place either via a sensor associated with the control device or the run-up behaviour is defined by the control device from at least one input value supplied thereto, which describes the run-up behaviour. According to this current run-up behaviour of the secondary side of the separating clutch respectively of the rotor of the hydrodynamic retarder, the control device actuates either the continuous closing of the separating clutch for (further) slip bridging between the primary side and the secondary side and hence for further acceleration of the rotor or it triggers the interruption of the closing process of the separating clutch, namely when the run-up behaviour does not correspond to the desired or expected condition. This way, any detrimental load or overload of the separating clutch can be avoided by interrupting the closing process in case of unwanted run-up behaviour, whereas conversely when run-up behaviour has been detected, corresponding the requested filling condition respectively an emptied working chamber of the retarder, the closing process of the separating clutch can be continued.

In a second embodiment according to the invention, the filling of the working chamber with working medium can take place faster or slower according to the detected run-up behaviour, to avoid the undesirable load or overload of the separating clutch.

For interpreting or respectively detecting the current run-up behaviour of the secondary side of the separating clutch and/or of the rotor, whereas in so doing any element between the separating clutch and the rotor can be monitored in terms of run-up behaviour respectively shall be covered by the wording, one or several of the following variables are for example appropriate:

the current acceleration of the secondary side of the separating clutch and/or of the rotor (which is governed here by the aforementioned);

the current braking torque increase of the retarder;

the rotational speed of the secondary side of the separating clutch and/or of the rotor or the rotation torque of the retarder after a preset period of time after starting to close the separating clutch;

the twist angle of the secondary side and/or of the rotor with respect to an angular position when starting to close the separating clutch after a preset period of time after starting to close the separating clutch;

with a hydrodynamic retarder, whose rotor is retractable from the stator in the axial direction when passing from the braking operation to the non-braking operation, the axial acceleration of the rotor or, after a preset period of time after starting to close the separating clutch, the axial position of the rotor.

Since the braking torque of the hydrodynamic retarder strongly depends on the rotational speed of the rotor of the hydrodynamic retarder, the decision as to whether the closing process of the separating clutch should be continued or interrupted should appropriately be made, also as a function of the rotational speed of the primary side of the separating clutch or a variable correlated thereto, or respectively triggered by the control device.

In an embodiment according to the invention, at least one limit value, one characteristic curve or one characteristic field can be deposited in the control device, which comes into play for deciding as to whether the closing process of the separating clutch or respectively should be continued or the closing process should be interrupted. It is of course also possible to deposit such a characteristic curve or respectively a limit value or characteristic field in another memory than in that of the control device. The variable, which describes the current run-up behaviour of the secondary side of the separating clutch respectively of the rotor of the retarder, and which advantageously is represented by the signal of the sensor or the input value supplied to the control device, is compared with the characteristic curve, the limit value or the characteristic field, in particular through a computer programme deposited in the control device, and according to the result of this comparison, the continuous closing of the separating clutch or the interruption of the closing process is initiated.

If the filling speed of the working chamber is adjusted according to the detected run-up behaviour, whereas the filling of the working chamber starts at the same time as the closing of the separating clutch or a short period of time before or a short period of time after said closing, the filling speed should, if a too slow run-up behaviour has been detected, appropriately be adjusted to a comparatively low value or reduced, whereas conversely in the case of a run-up behaviour which refers to a faster run-up as expected, the filling speed can be maintained or can be increased.

The filling speed can be adjusted particularly according to a comparison with a reference gradient, which describes the run-up behaviour, for instance comparison to a gradient of the rotational speed of the rotor or of the rotational torque of the retarder or in the presence of an axially mobile rotor of the axial speed of the rotor.

BRIEF DESCRIPTION OF THE DRAWINGS

The invention will now be described by way of example using an embodiment.

Wherein

FIG. 1 shows a motor vehicle drive train having a hydrodynamic retarder driven according to the invention and disconnectable via a separating clutch.

DETAILED DESCRIPTION

FIG. 1 is a very schematical representation of a motor vehicle drive train having an internal combustion engine 11 and a transmission 12 situated downstream thereof, for example an automatic transmission or an automated shift transmission or a manual transmission, whereas the transmission 12 comprises a transmission input shaft 13 as well as a transmission output shaft 14. Drive wheels 15 of the motor vehicle are driven via the transmission output shaft 14.

A hydrodynamic retarder 17 is positioned on a so-called auxiliary drive 16 of the transmission 12 on the secondary side. The auxiliary drive 16 hence represents the drive unit 1 of the hydrodynamic retarder 17. However, the hydrodynamic retarder 17 could also be provided on another position by way of example inside the transmission 12, on the primary side of the transmission 12 or on the internal combustion engine 11 on its primary side or on its secondary side or on an auxiliary drive thereof.

The hydrodynamic retarder 17 comprises a rotor 2 and a stator 3 which together form the working chamber 4. The rotor 2 is connected to the drive unit 1 via a separating clutch 5. The separating clutch 5 includes a primary side 5.1 and a secondary side 5.2 so that the separating clutch 5 is closed to switch the retarder 17 on, until the secondary side 5.2 rotates with the rotational speed of the primary side 5.1 after a slip bridging, and the separating clutch 5 is opened again to switch the retarder 17 off.

The rotational speed of the secondary side 5.2 or respectively of the rotor 2 of the hydrodynamic clutch 17 can for example be detected via the represented sensor 7 or calculated from other known variables.

A control device 6 is associated with the hydrodynamic retarder 17 and/or the separating clutch 5, which device controls the closing of the separating clutch 5 and the filling of the working chamber 4 of the hydrodynamic retarder 17. In so doing, the control device 6 for instance accesses the sensor 7 and if necessary another sensor 8, which detects the rotational speed of the primary side 5.1 of the separating clutch 5 and hence of the drive unit 1. The control device 6 can detect, from the rotational speed of the secondary side 5.2 or respectively of the rotor 2 or respectively from the gradient of the same, the current run-up behaviour of the secondary side 5.2 and of the rotor 2 of the hydrodynamic retarder 17 when closing the separating clutch 5 and if required, in case of suspected damage or of undesirable wear of the separating clutch 5, interrupt said closing process. To do so, the control device 6 can for instance also access signals of the other sensor 8, for assessing the risk of damage for the separating clutch 5 on a case to case basis.

The invention claimed is:

1. A hydrodynamic retarder comprising:
 a rotor which can be brought into rotation via a drive unit and a fixed stator or a stator rotating in opposite direction to the rotor, wherein:
  the rotor and the stator comprise bladed wheels, which form together a working chamber which can be filled with working medium;
  the drive unit is provided with a separating clutch, by means of which the rotor can be disconnected for its immobilisation, comprising a driven primary side and a secondary side associated with the rotor;
 a control device which controls the opening and closing of the separating clutch for switching the retarder on and off;
 wherein the control device when closing the separating clutch detects the run-up behaviour of at least one of the secondary side of the separating clutch and the rotor via at least one associated sensor, or wherein the control device when closing the separating clutch defines the run-up behaviour from at least one input value supplied thereto and according to the run-up behaviour initiates either the continuous closing of the separating clutch for slip bridging between the primary side and the secondary side for accelerating the rotor or the interruption of the closing process of the separating clutch.

2. The hydrodynamic retarder according to claim 1, wherein at least one of said at least one sensor that detects at least one of the following variables and the control device that includes at least one signal input, to which at least one signal is applied, which describes said at least one of the following variables:
 the current acceleration of at least one of the secondary side and the rotor;
 the current braking torque increase of the retarder;
 the rotational speed of at least one of the secondary side and the rotor or the rotation torque of the retarder after a preset period of time after starting to close the separating clutch;
 the twist angle of at least one of the secondary side and the rotor with respect to an angular position when starting to close the separating clutch after a preset period of time after starting to close the separating clutch;
 with the hydrodynamic retarder, whose rotor is disconnectable from the stator in the axial direction when passing from the braking operation to the non-braking operation, the axial acceleration of the rotor or the axial position of the rotor after a preset period of time after starting to close the separating clutch.

3. The hydrodynamic retarder according to claim 2, wherein the control device when closing the separating clutch initiates the continuous closing or the interruption of the closing process also as a function of the rotational speed of the primary side of the separating clutch or according to a variable correlated thereto.

4. The hydrodynamic retarder according to claim 3, wherein at least one limit value, one characteristic curve or one characteristic field is deposited in the control device or another memory, with which the control device compares the signal of the sensor, the supplied input value, or a value calculated from the signal of the sensor or from the supplied input value, and according to the result of this comparison initiates the continuous closing of the separating clutch or the interruption of the closing process.

5. The hydrodynamic retarder according to claim 3, wherein the control device also controls the filling of the working chamber of the retarder with working medium, whereas the working chamber for switching on the retarder is being filled simultaneously with the closing of the separating clutch or a set period of time earlier or later than the beginning of the closing of said separating clutch, and controls the filling speed of the working chamber according to the run-up behaviour of the secondary side of the separating clutch or of the rotor.

6. The hydrodynamic retarder according to claim 2, wherein at least one limit value, one characteristic curve or one characteristic field is deposited in the control device or another memory, with which the control device compares the signal of the sensor, the supplied input value, or a value calculated from the signal of the sensor or from the supplied input value, and according to the result of this comparison initiates the continuous closing of the separating clutch or the interruption of the closing process.

7. The hydrodynamic retarder according to claim 6, wherein the control device also controls the filling of the working chamber of the retarder with working medium, whereas the working chamber for switching on the retarder is being filled simultaneously with the closing of the separating clutch or a set period of time earlier or later than the beginning of the closing of said separating clutch, and controls the filling speed of the working chamber according to the run-up behaviour of the secondary side of the separating clutch or of the rotor.

8. The hydrodynamic retarder according to claim 2, wherein the control device also controls the filling of the working chamber of the retarder with working medium, whereas the working chamber for switching on the retarder is being filled simultaneously with the closing of the separating clutch or a set period of time earlier or later than the beginning of the closing of said separating clutch, and controls the filling speed of the working chamber according to the run-up behaviour of the secondary side of the separating clutch or of the rotor.

9. The hydrodynamic retarder according to claim 1, wherein the control device when closing the separating clutch initiates the continuous closing or the interruption of the closing process also as a function of the rotational speed of the primary side of the separating clutch or according to a variable correlated thereto.

10. The hydrodynamic retarder according to claim 9, wherein at least one limit value, one characteristic curve or one characteristic field is deposited in the control device or another memory, with which the control device compares the signal of the sensor, the supplied input value, or a value calculated from the signal of the sensor or from the supplied input value, and according to the result of this comparison initiates the continuous closing of the separating clutch or the interruption of the closing process.

11. The hydrodynamic retarder according to claim 10, wherein the control device also controls the filling of the working chamber of the retarder with working medium, whereas the working chamber for switching on the retarder is being filled simultaneously with the closing of the separating clutch or a set period of time earlier or later than the beginning of the closing of said separating clutch and controls the filling speed of the working chamber according to the run-up behaviour of the secondary side of the separating clutch or of the rotor.

12. The hydrodynamic retarder according to claim 9, wherein the control device also controls the filling of the working chamber of the retarder with working medium, whereas the working chamber for switching on the retarder is being filled simultaneously with the closing of the separating clutch or a set period of time earlier or later than the beginning of the closing of said separating clutch, and controls the filling speed of the working chamber according to the run-up behaviour of the secondary side of the separating clutch or of the rotor.

13. The hydrodynamic retarder according to claim 1, wherein at least one limit value, one characteristic curve or one characteristic field is deposited in the control device or another memory, with which the control device compares the signal of the sensor, the supplied input value, or a value calculated from the signal of the sensor or from the supplied input value, and according to the result of this comparison initiates the continuous closing of the separating clutch or the interruption of the closing process.

14. The hydrodynamic retarder according to claim 13, wherein the control device also controls the filling of the working chamber of the retarder with working medium., whereas the working chamber for switching on the retarder is being filled simultaneously with the closing of the separating clutch or a set period of time earlier or later than the beginning of the closing of said separating clutch, and controls the filling speed of the working chamber according to the run-up behaviour of the secondary side of the separating clutch or of the rotor.

15. The hydrodynamic retarder according to claim 1, wherein the control device also controls the filling of the working chamber of the retarder with working medium, whereas the working chamber for switching on the retarder is being filled simultaneously with the closing of the separating clutch or a set period of time earlier or later than the beginning of the closing of said separating clutch, and controls the filling speed of the working chamber according to the run-up behaviour of the secondary side of the separating clutch or of the rotor.

16. A method for controlling the switching on and off of a hydrodynamic retarder, which includes a rotor which can be brought into rotation and a fixed stator or a stator rotating in opposite direction to the rotor, wherein the rotor and the stator comprise bladed wheels, which form together a working chamber which can be filled with working medium, and at least the rotor is disconnected from the drive unit by opening a separating clutch, comprising a driven primary side and a secondary side facing the rotor, and is brought into rotation from standstill by closing the separating clutch;

wherein when closing the separating clutch the run-up behaviour of at least one of the secondary side of the separating clutch and the rotor is detected, at least indirectly, and according to the detected run-up behaviour either the closing of the separating clutch is continued for accelerating the rotor or the closing process of the separating clutch is interrupted.

17. The method according to claim 16, wherein the run-up behaviour of at least one of the secondary side of the separating clutch and the rotor of the retarder is detected by calculating or detecting at least of the following variables:

the current acceleration of at least one of the secondary side and the rotor;

the current braking torque increase of the retarder;

the rotational speed of at least one of the secondary side and the rotor or the rotation torque of the retarder after a preset period of time after starting to close the separating clutch;

the twist angle of at least one of the secondary side and the rotor with respect to an angular position when starting to close the separating clutch after a preset period of time after starting to close the separating clutch;

with the hydrodynamic retarder, whose rotor is disconnectable from the stator in the axial direction when passing from the braking operation to the non-braking operation, the axial acceleration of the rotor or the axial position of the rotor after a preset period of time after starting to close the separating clutch.

18. The method according to claim 16, wherein moreover the rotational speed or a correlating variable of the primary side of the separating clutch is detected or calculated, and the closing of the separating clutch is continued or the closing process of the separating clutch is interrupted according to the rotational speed or the correlating variable.

19. The method according to claim 16, wherein a detected or calculated variable, describing the current run-up behaviour of the secondary side of the separating clutch or of the rotor, is compared with a stored limit value, a stored characteristic curve or a stored characteristic field, and according to the result of said comparison the closing of the separating clutch is continued or the closing process is interrupted.

20. The method according to claim 16, wherein the filling of the working chamber of the retarder is started at the same time as the beginning of the closing of the separating clutch or offset by a preset period of time, and the filling speed is adjusted or varied according to the detected run-up behaviour.

* * * * *